(12) United States Patent
Mochida et al.

(10) Patent No.: US 6,663,548 B2
(45) Date of Patent: Dec. 16, 2003

(54) SPINDLE UNIT FOR A MACHINE TOOL

(75) Inventors: Hideki Mochida, Kanagawa (JP); Hiroo Kaneko, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 0 days.

(21) Appl. No.: 10/300,241

(22) Filed: Nov. 20, 2002

(65) Prior Publication Data

US 2003/0073555 A1 Apr. 17, 2003

Related U.S. Application Data

(63) Continuation of application No. 09/940,355, filed on Aug. 28, 2001, now abandoned.

(30) Foreign Application Priority Data

Oct. 16, 2000 (JP) ........................................ 2000-315165

(51) Int. Cl.⁷ ................................................. B23C 7/00
(52) U.S. Cl. ........................................ 483/31; 409/232
(58) Field of Search ............................ 483/31; 409/232, 409/234; 279/2.03, 4.06, 4.03, 2.08, 103, 141

(56) References Cited

U.S. PATENT DOCUMENTS

| | | | | |
|---|---|---|---|---|
| 4,443,140 A | * | 4/1984 | Boetto | 408/147 |
| 4,746,252 A | * | 5/1988 | Jesinger | 279/141 |
| 4,958,969 A | * | 9/1990 | Och | 279/2.08 |
| 5,002,442 A | * | 3/1991 | Rutschle | 408/238 |
| 5,039,261 A | * | 8/1991 | Takada | 409/136 |
| 5,061,129 A | * | 10/1991 | Baudermann | 409/234 |
| 5,909,882 A | * | 6/1999 | Schill | 219/69.15 |
| 5,944,325 A | * | 8/1999 | Schmeisl | 279/4.03 |
| 6,036,415 A | * | 3/2000 | Sheehan et al. | 409/231 |
| 6,077,003 A | * | 6/2000 | Laube | 279/103 |
| 6,145,849 A | * | 11/2000 | Bae et al. | 118/503 |
| 6,179,530 B1 | * | 1/2001 | Retzbach et al. | 279/2.08 |
| 6,311,987 B1 | * | 11/2001 | Rinne et al. | 279/2.08 |

FOREIGN PATENT DOCUMENTS

| | | |
|---|---|---|
| JP | 62-15043 | 1/1987 |
| JP | 8-174364 | 7/1996 |

* cited by examiner

*Primary Examiner*—A. L. Wellington
*Assistant Examiner*—Dana Ross
(74) *Attorney, Agent, or Firm*—Paul & Paul

(57) ABSTRACT

The present relates to a spindle unit for a machine tool having a spindle rotatably held in a housing and a hydraulic tool holding system at a forward end of the spindle and capable of holding a tool on the spindle without a tool holder. The spindle of the spindle unit is provided with a tool receiving bore formed in the forward end portion of the spindle along the rotational axis thereof, one or more pressure chambers disposed around the tool receiving bore in spaced relationship from the tool receiving bore by a thin wall elastically deformable in a radial direction of the spindle, and a working fluid passage formed in the spindle and in fluid communication with the one or more pressure chambers. The spindle unit further includes a pressure adjusting device arranged in the rear portion of the spindle unit and connected to the pressure chamber through the working fluid passage. The pressure adjusting device adjustably changes the pressure of the working fluid within the pressure chamber so that it can elastically deform the thin wall to enlarge or reduce the tool receiving bore in radius, thereby holding or releasing the tool inserted into the tool receiving bore.

14 Claims, 9 Drawing Sheets

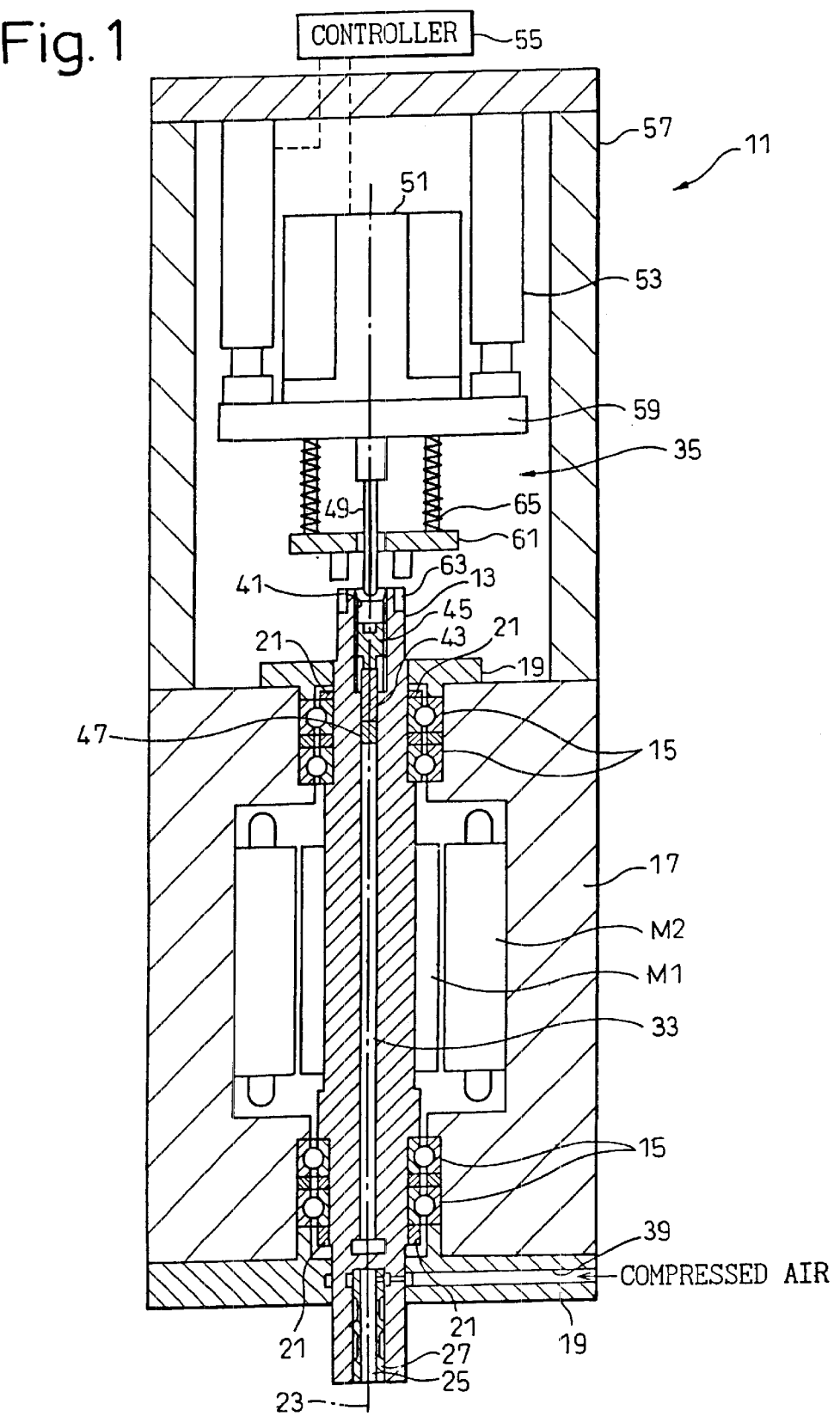

SPINDLE UNIT FOR A MACHINE TOOL

This is a continuation application of U.S. non-provisional patent application Ser. No. 09/940,355, filed Aug. 28, 2001, for a spindle unit for a machine tool, now abandoned. That prior application claims priority of foreign application, Japan number 2000-315165, filed Oct. 16, 2000 which priority claim is incorporated herein.

BACKGROUND OF THE INVENTION

1. Field of the Invention

The present invention relates to a spindle unit for a machine tool having a spindle rotatably supported in a housing, and more particularly relates to a spindle unit for a machine tool which is provided at a forward end of a spindle rotatably supported in a housing with a hydraulic tool holding system for allowing a tool to be held in the spindle without a tool holder.

2. Description of the Related Art

In a tool machine, two types of spindle units, which are different from each other in a way of mounting a tool on a spindle rotatably supported in a housing of the spindle unit, can be used. In one type, a tool holder with a tool held therein is mounted on the spindle in order to mount the tool therein. In the other type, what is called a holderless spindle type, a tool holder with a tool held therein is not mounted on the spindle but only a tool is directly mounted therein. The holderless type of spindle unit is often used in a machine tool especially for machining a workpiece of complicated shape, such as a rib groove of a mold, by means of a relatively narrow tool having a small cross section.

The holderless type of spindle unit includes one having a mechanical tool holding system capable of gripping the shank portion of the tool by a collet or other means located at a forward end of a draw bar of the spindle unit and one having a hydraulic tool holding system capable of holding the shank portion of the tool by deforming a tool receiving bore for receiving the tool therein, which is formed in the forward end of the spindle unit, by means of a pressure medium (working fluid) such as hydraulic oil.

It should be noted that the term "forward" or "front" herein refers to a side holding the tool and machining the workpiece or the like and that the term "rear" herein refers to a side opposed to the side machining the workpiece or the like.

A mechanical tool holding system is disclosed, for example, in Japanese Unexamined Patent Publication (Kokai) No. 8-174364, which includes a spindle formed with a tool receiving bore at a forward end thereof and a draw bar extending through the spindle along the axis thereof. During attachment or detachment of a tool, the mechanical tool holding system grips and releases a shank portion of a tool inserted into the tool receiving bore by a collet located at the forward end of the draw bar.

A hydraulic tool holding system is disclosed, for example, in Japanese Unexamined Patent Publication (Kokai) No. 62-15043, which includes a spindle formed with a tool receiving bore at a forward end thereof and a pressure chamber surrounding the tool receiving bore at a distance. The hydraulic tool holding system changes the pressure of a working fluid enclosed in the pressure chamber so that it enlarges or reduces the diameter of the tool receiving bore in cross section in order to attach or detach a tool inserted into the tool receiving bore to/from the spindle.

Nowadays, the machining of a workpiece increasingly requires a much higher machining accuracy. Thus, this requirement arouses concern about factors which can cause degradation of machining accuracy, such as misalignment between the rotational axis of the spindle and a center axis of the tool mounted in the spindle, a change in actual tool length caused by deviation of an axial tool hold position where the spindle holds the tool along the length thereof.

In the case of an NC (numerical control) machine tool using an automatic tool changer, the above conventional tool holding systems suffer from the following drawbacks resulting from deviation of the tool hold position in the mounting of the tool.

In the tool holding system provided with the collet arranged at the forward end of the draw bar, the draw bar draws the collet rearward to grip the tool and this movement of the collet moves the tool in its axial direction, thereby to change the tool hold position. This may result in deviation of the actual tool length.

On the other hand, in the hydraulic tool holding system, a hydraulic chuck is secured on the front end face of the spindle by means of suitable fasteners such as screws, as described, for example, in. Japanese Unexamined Patent Publication (Kokai) No. 62-15043. Such a hydraulic tool holding system may rotate eccentrically the tool with respect to the center axis thereof due to misalignment between the rotational axis of the spindle and the center axis of the chuck. Thus, such a hydraulic tool system can adversely affect machining accuracy as a result of eccentric rotation of the tool.

Further, in order to adjustably change the fluid pressure in the hydraulic chuck secured to the forward end of the spindle, a fluid pressure adjusting screw provided in the hydraulic chuck must be turned at the forward end of the spindle by a wrench or the like. However, since a table and a workpiece are disposed in an area surrounding the forward end of the spindle, there may be insufficient space for working comfortably in the area. Therefore, it is not easy to change or adjust the fluid pressure, and this may reduce operating efficiency. In addition, when the automatic tool changer is used with the machine tool, the mechanical tool holding system is often used in combination therewith, because the operation of changing the fluid pressure must be performed at the forward end of the spindle in the conventional hydraulic tool holding system as described above. However, use of the hydraulic tool holding system makes it difficult to fully automate a tool change operation.

SUMMARY OF THE INVENTION

It is therefore an object of the invention to provide a spindle unit for a machine tool having a spindle and a holderless type of tool holding system, which can hold a tool so that the rotational axis of the spindle is in alignment with the center axis of the tool when the tool is mounted on the spindle, with substantially no deviation in the axial position of a tool held by the tool holding system, and facilitates automatization of the operations of holding and releasing tools.

The above object is accomplished by a spindle unit for a machine tool according to the present invention which is configured to form a tool receiving bore either directly in the forward end of the spindle or in an adapter fixedly secured to the forward end of the spindle so that the center axis of the tool receiving bore is in alignment with the rotational axis of the spindle, and to employ a hydraulic tool holding system which allows the fluid pressure of the hydraulic tool holding system to be adjustably changed by an operation performed on the rear side of the spindle, where it is easier to secure sufficient space for the operation to be comfortably performed.

In accordance with a first aspect of the present invention, there is provided a spindle unit for a machine tool having a spindle housing, which includes a spindle having a rotational axis and rotatably supported in the spindle housing; a tool receiving bore formed in the forward end portion of the spindle and extending along the rotational axis of the spindle; one or more pressure chambers disposed around the tool receiving bore in spaced relationship therefrom by a thin wall elastically deformable in a radial direction of the spindle, the pressure chamber being filled with working fluid; a working fluid passage formed in the spindle and in fluid communication with the one or more pressure chambers; and a pressure adjusting device arranged in the rear portion of the spindle unit and connected to the pressure chamber through the working fluid passage, the pressure adjusting device adjustably changing the pressure of the working fluid within the pressure chamber so that the pressure adjusting device can elastically deform the thin wall to enlarge or reduce the tool receiving bore in radius, thereby holding or releasing the tool inserted into the tool receiving bore.

In the aforementioned spindle unit, the spindle may include an adaptor mounted on the forward end of the spindle and the tool bore is formed in the adaptor.

In one embodiment of the spindle unit, a pressure element insert hole is formed in the rear end portion of the spindle to be in fluid communication with the working fluid passage, and the pressure adjusting device includes a pressure element inserted into the pressure element insert hole for pressurizing the working fluid in the working fluid passage and a pressure element driving device for driving the pressure element.

In this embodiment, preferably, the pressure element is a piston, and a space defined by the pressure element insert hole and the piston is filled with the working fluid and in fluid communication with the working fluid passage.

The pressure element may further include a pressure screw coupled to the piston, and the pressure element insert hole may be formed with a threaded portion for engaging with the pressure screw of the pressure element.

In this case, preferably, the pressure element driving device includes a motor having a rotatable wrench for rotating the pressure screw, an actuator for moving the wrench to engage the wrench with and disengage it from the pressure screw, and a controller for controlling the operations of the actuator and the motor. The motor may be a servomotor. More preferably, during a process for holding the tool in the spindle, the controller operates the servomotor in a first operating mode in which rotational speed control and position control are performed, and subsequently operates the servomotor in a second operating mode in which torque control is performed.

The pressure element driving device may be rotatably coupled to the piston. In this case, preferably, a compression spring is placed within the space so as to urge the piston in a direction to increase the pressure of the working fluid in the space.

A compression spring may placed within the space so as to urge the piston in a direction to increase the pressure of the working fluid in the space, and the pressure element driving device may be separate from the piston and move the piston against an urging force of the compression spring to release the tool in the tool receiving bore.

In another embodiment of the spindle unit, a check valve is disposed at the rear end of the working fluid passage opening at the rear end of the spindle, and the pressure adjusting device includes a movable working fluid feeding device able to be seated on the rear end face of the spindle, the working fluid feeding device opening the check valve to provide fluid communication between the working fluid passage and the pressure adjusting device when the working fluid feeding device is seated on the rear end face, thereby allowing the working fluid feeding device to control the pressure of the working fluid within the pressure chamber.

In accordance with a second aspect of the present invention, there is provided a spindle unit for a machine tool having a spindle housing, which includes a spindle having a rotational axis and rotatably supported in the spindle housing; an adaptor having a center axis and attached to the forward end of the spindle in a manner to align the center axis of the adaptor with the rotational axis of the spindle; a tool receiving bore formed in the adaptor and extending along the center axis of the adaptor; one or more pressure chambers disposed around the tool receiving bore in spaced relationship therefrom by a thin wall elastically deformable in a radial direction of the adaptor, the pressure chamber filled with working fluid; a working fluid passage formed in the spindle and the adaptor and in fluid communication with the one or more pressure chambers; and a pressure adjusting device arranged in the rear portion of the spindle unit and connected to the pressure chamber through the working fluid passage, the pressure adjusting device adjustably changing pressure of the working fluid within the pressure chamber so that the pressure adjusting device can elastically deform the thin wall to enlarge or reduce the tool receiving bore in radius, thereby holding or releasing the tool inserted into the tool receiving bore.

In accordance with a third aspect of the present invention, there is provided a spindle unit for a machine tool having a spindle housing, which includes a spindle having a rotational axis and rotatably supported in the spindle housing; a tool receiving bore formed in the forward end portion of the spindle and extending along the rotational axis of the spindle; one or more pressure chambers disposed around the tool receiving bore in spaced relationship therefrom by a thin wall elastically deformable in a radial direction of the spindle, the pressure chamber being filled with working fluid; a working fluid passage formed in the spindle and in fluid communication with the one or more pressure chambers; and a pressure adjusting device connected to the pressure chamber through the working fluid passage, the pressure adjusting device adjustably changing the pressure of the working fluid within the pressure chamber so that the pressure adjusting device can elastically deform the thin wall to enlarge or reduce the tool receiving bore in radius, thereby holding or releasing the tool inserted into the tool receiving bore.

In the spindle unit according to the present invention, the tool receiving bore extending along the rotational axis of the spindle is formed in the forward end portion of the spindle of the machine tool and at the same time the pressure chamber is disposed around the tool receiving bore. This arrangement allows the tool to be held in or released from the forward end of the spindle by adjustably changing the fluid pressure within the pressure chamber. Therefore, the spindle unit can eliminate or reduce deviation of the axial position of the tool held by the spindle, deviation being one drawback of the conventional tool holding system using a collet. The same effect can be achieved by the alternative spindle unit in which the adaptor preformed with a tool receiving bore, one or more pressure chambers and a working fluid passage is fixedly secured to the spindle so as to form a single unit.

Further, since changes of pressure of the working fluid within the pressure chamber are performed by a pressure adjusting device disposed in the rear portion of the spindle unit, the pressure change operations for holding the tool in or releasing it from the spindle do not have to be performed at the forward end portion of the spindle, in which the spindle, the housing for supporting the spindle and other parts may interfere with the operation due to lack of sufficient space for comfortable operation. This facilitates the operation of holding the tool in or releasing it from the spindle.

The arrangement of the pressure adjusting device at the rear portion of the spindle unit also facilitates automation of the operation for holding the tool in or releasing it from the spindle. For example, the tool holding or releasing operation can be automated by the pressure element being inserted into the pressure element insert hole opening to the rear end face of the spindle and by the pressure element driving device driving the pressure element to pressurize the working fluid within the working fluid passage.

Further, the tool holding or releasing operation can be automated by the check valve being arranged at the end of the working fluid passage opening to the rear end face of the spindle so that the movable pressure adjusting device can open the check valve when it is seated on the rear end face of the spindle and by the pressure adjusting device adjustably changing the pressure of the working fluid within the working fluid passage to change the pressure of the working fluid within the pressure chamber.

Thus, automated operation of holding the tool in or releasing it from the spindle can be achieved by the spindle unit, despite the use of the hydraulic tool hold system. Further, a completely automated tool change operation can be achieved when the spindle unit is used in combination with the automatic tool changer.

In addition, the tool receiving bore formed in the forward end of the spindle can eliminate the need to provide an adaptor with the tool receiving bore preformed therein. As a result, the tool receiving bore formed in the spindle prevents misalignment between the rotational axis of the spindle and the center axis of the tool receiving bore during mounting of the adaptor on the spindle and therefore makes it possible to hold the tool in the proper position.

BRIEF DESCRIPTION OF THE DRAWINGS

The above and other objects, features, and advantages of the present invention will be made more apparent from the following description of the preferred embodiments thereof with reference to the accompanying drawings, wherein:

FIG. 1 is a longitudinal sectional view of an embodiment of a spindle unit of a machine tool according to the present invention;

DESCRIPTION OF THE PREFERRED EMBODIMENTS

Figure 2A:
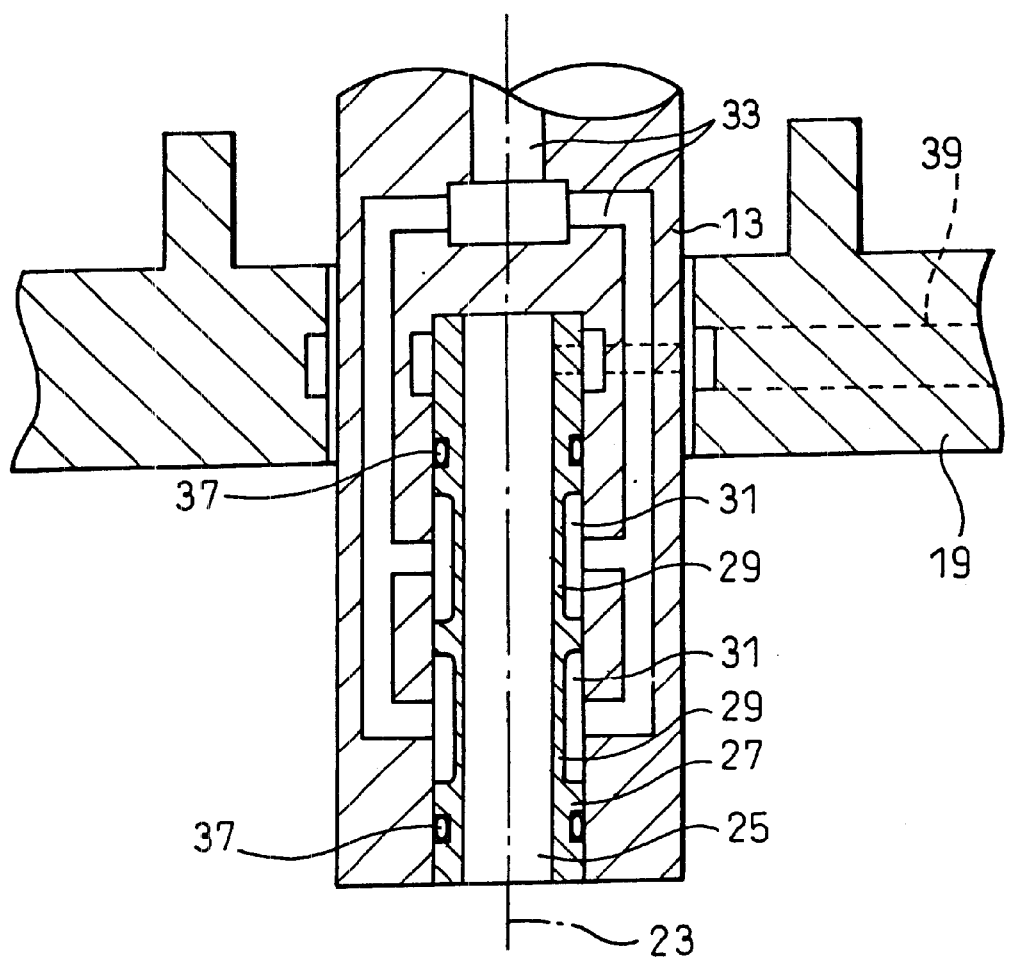
FIG. 2A is an enlarged longitudinal sectional view of a forward end of the spindle shown in FIG. 1.

Preferred embodiments of the present invention will be now described with reference to the drawings.

In the following description, it should be noted that unless otherwise specified, the term "forward" or "front" refers to a side holding the tool and machining a workpiece or the like, and that the term "rear" refers to a side opposed to the side machining the workpiece or the like.

Referring to FIG. 1, a spindle unit 11 for a machine tool according to the present invention includes a spindle 13, a housing 17 for rotatably supporting the spindle 13 through bearings 15 respectively disposed at the front and rear ends of the spindle 13. The bearings 15 are fixedly secured in position on the housing 17 by a shoulder formed therein and by a bearing keep 19 and bearing keep nuts 21. The spindle unit 11 includes a rotor M1 fixed on the center portion of the outer peripheral surface of the spindle 13 and a stator M2 arranged on the inner peripheral surface of the housing 17. The rotor M1 and the stator M2 are opposed to each other at a distance, so that an electromagnetic force acting between the rotor M1 and the stator M2 can rotate the spindle 13 relative to the housing 17.

A tool receiving bore 25 of a substantially circular cross section is formed in the forward end face of the spindle 13 and extends rearwards from the forward end face along the rotational axis of the spindle 13 in the forward end portion thereof. More particularly, the tool receiving bore 25 is defined by an inner hole of a cylindrical sleeve 27, which is inserted into a concentric hole of a circular cross section formed in the forward end face of the spindle 13 and which is fixed in the hole by a suitable joining method such as welding. Preferably, after the sleeve 27 is fixed in the hole of the spindle 13, the inner peripheral surface of the sleeve 27 may be machined by grinding so as to bring the center axis of the tool receiving bore 25 (more exactly, the inner hole of the sleeve 27 fixedly secured in the hole of the spindle 13) into line with the rotational axis 23 of the spindle 13. This arrangement makes possible proper mounting of the tool (not shown) on the spindle 13, thereby preventing the tool from rotating about an eccentric axis with respect to its center axis during rotation.

One or more recesses are formed on the outer peripheral surface of the sleeve 27. When the sleeve 27 is inserted into the hole formed in the forward end face of the spindle 13, the one or more recesses of the sleeve 27, in cooperation with the peripheral surface of the hole formed in the forward end face of the spindle 13, define one or more pressure chambers 31 around the inner hole of the sleeve 27 (i.e. the tool receiving bore 25) in spaced relationship from the tool receiving bore 25 by a thin wall 29 of the sleeve 27 deformable in its radial direction. The one or more pressure chambers 31 are connected to a pressure adjusting device 35 disposed in the rear portion of the spindle unit 11 through a working fluid passage 33 extending rearward through the spindle 13. It should be noted that seals 37 are disposed to the forward and rear sides of the pressure chamber 31 on an interface between the inner peripheral surface of the hole in the forward end of the spindle 13 and the outer peripheral surface of the sleeve 27, in order to prevent the working fluid enclosed in the pressure chamber 31 from leaking out along the interface. The pressure chamber 31 is preferably constituted by an annular chamber but may be constituted by a plurality of chambers circumferentially spaced apart from each other at equal intervals. The pressure chambers 31 are also preferably arranged in two ring-like rows spaced apart from each other in the axial direction of the tool receiving bore 25 as shown in FIG. 2A, but may be arranged in one to three rows or more.

As shown in FIGS. 1 and 2A, an air passage 39 extends through the bearing keep 19, the spindle 13 and the sleeve 27 in the radial direction of the spindle unit 11 and opens to the inside of the tool receiving bore 25. Compressed air is supplied from the exterior of the spindle unit 11 to the air passage 39 and used to clean the inside of the tool receiving bore 25 or to check the holding of the tool in the tool receiving bore 25 by monitoring the back pressure of the compressed air.

Referring to FIG. 1, the pressure adjusting device 35 disposed in the rear portion of the spindle unit 11 will be now described in detail.

The pressure adjusting device 35 includes a pressure element for directly or indirectly pressurizing the working fluid in the working fluid passage 33 and a pressure element driving device for driving the pressure element.

The pressure element is inserted into a pressure element insert hole 41, which is formed in the rear end face of the spindle 13 and in communication with the working fluid passage 33. The pressure element also includes a piston 43 inserted in the pressure element insert hole 41 to extend to the working fluid passage 33 and a pressure screw 45 coupled to the piston 43. The piston 43 is provided at the forward end thereof with a seal member 47 for preventing the working fluid from leaking out of the working fluid passage 33. The pressure element insert hole 41 is formed with a threaded portion on the inner peripheral surface thereof for engaging with the pressure screw 45.

The pressure element driving device, for example, as shown in FIG. 1, includes wrench motor 51 having a rotating shaft with a wrench 49 (for example, a hexagonal wrench) attached thereto, an actuator 53 for moving the wrench motor 51 toward and away from the rear end face of the spindle to engage the wrench 49 attached to the wrench motor 51 with or disengage it from an engaging recess (for example, a hexagonal recess) formed at the rear end of the pressure screw 45 of the pressure element and a controller 55 for controlling the operations of the wrench motor 51 and the actuator 53. The wrench motor 51 is mounted on a movable plate 59, which is movably supported by the actuators 53 such as rod cylinders fixed on a bracket 57 located in the rear portion of the spindle unit 11. This arrangement allows the wrench 49 to engage with or disengage from the engaging recess formed at the rear end of the pressure element.

The pressure element driving device further includes a locking element 61 for stopping the rotation of the spindle 13 when the wrench 49 engages with the engaging recess of the pressure screw 45 of the pressure element in order to drive the same. In the embodiment shown in FIG. 1, the locking element 61 is supported on the side of the movable plate 59 opposing the rear end face of the spindle 13. As a result, when the movable plate 59 is moved toward the spindle 13 by the actuator 53, the locking element 61 engages with notches or grooves 63 formed on the rear end face of the spindle 13 to lock it, thereby preventing the spindle 13 from rotating. The locking element 61 is preferably supported through elastic bodies 65 such as compression springs on the movable plate 59.

Figure 2B:
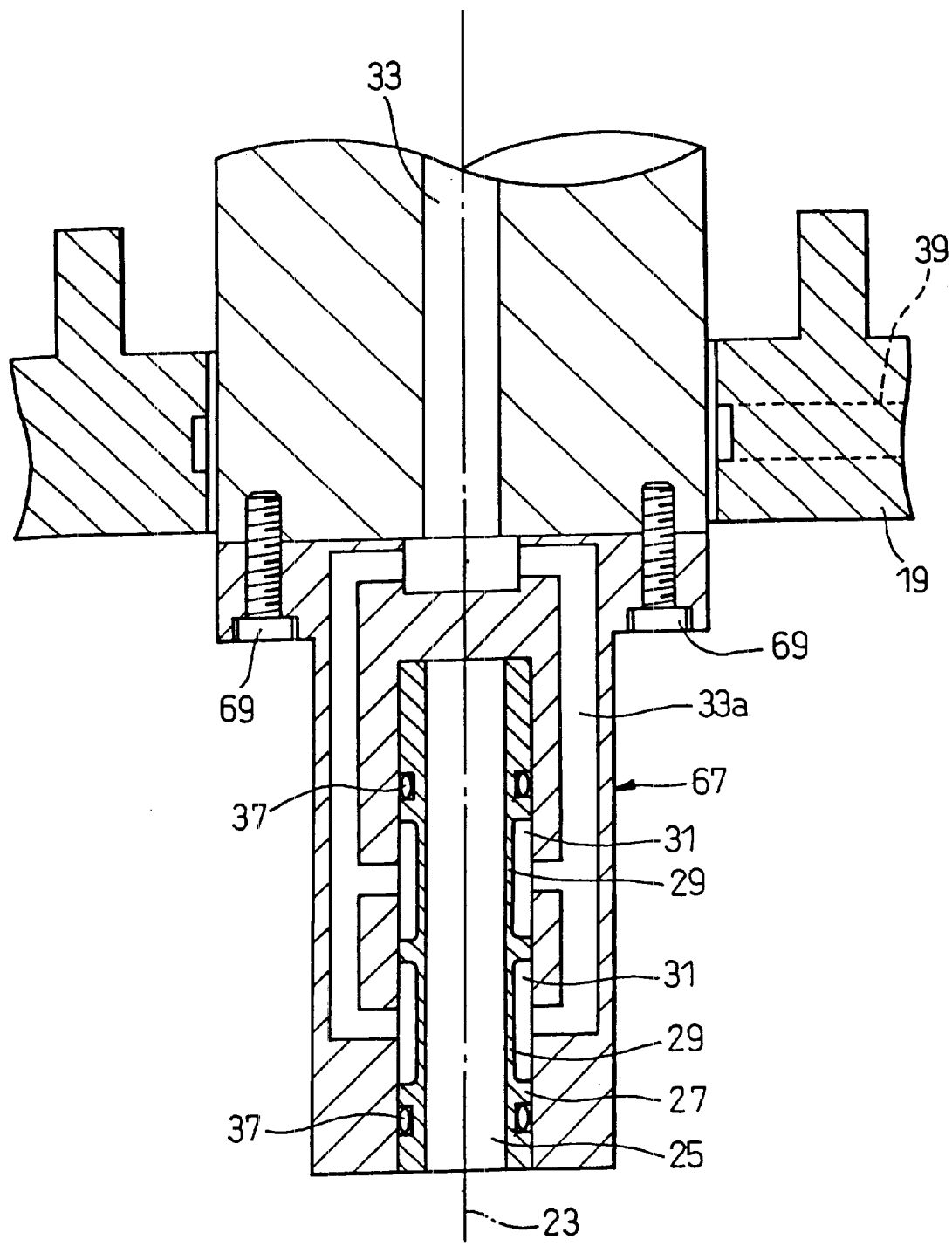
FIG. 2B is an enlarged longitudinal sectional view of another embodiment of a forward end of the spindle.

Although an embodiment has been described above in which the forward end of the spindle 13 is formed integral with the tool receiving bore 25, an adaptor 67 preformed with a tool receiving bore 25, a pressure chamber 31 and a working fluid passage 33 may of course be fixedly secured to the forward end of the spindle 13 by suitable fasteners such as bolts 69 so as to form a single unit with the spindle 13, as shown in FIG. 2B.

Further, in the case where the tool receiving bore 25 is integrated with the forward end of the spindle 13, the pressure adjusting device 35 may be disposed on the forward side of the spindle 13. Even with this arrangement, misalignment between the rotational axis of the spindle 13 and the center axis of the tool receiving bore 25 can be eliminated, and thus improved machining accuracy achieved.

Figure 3:
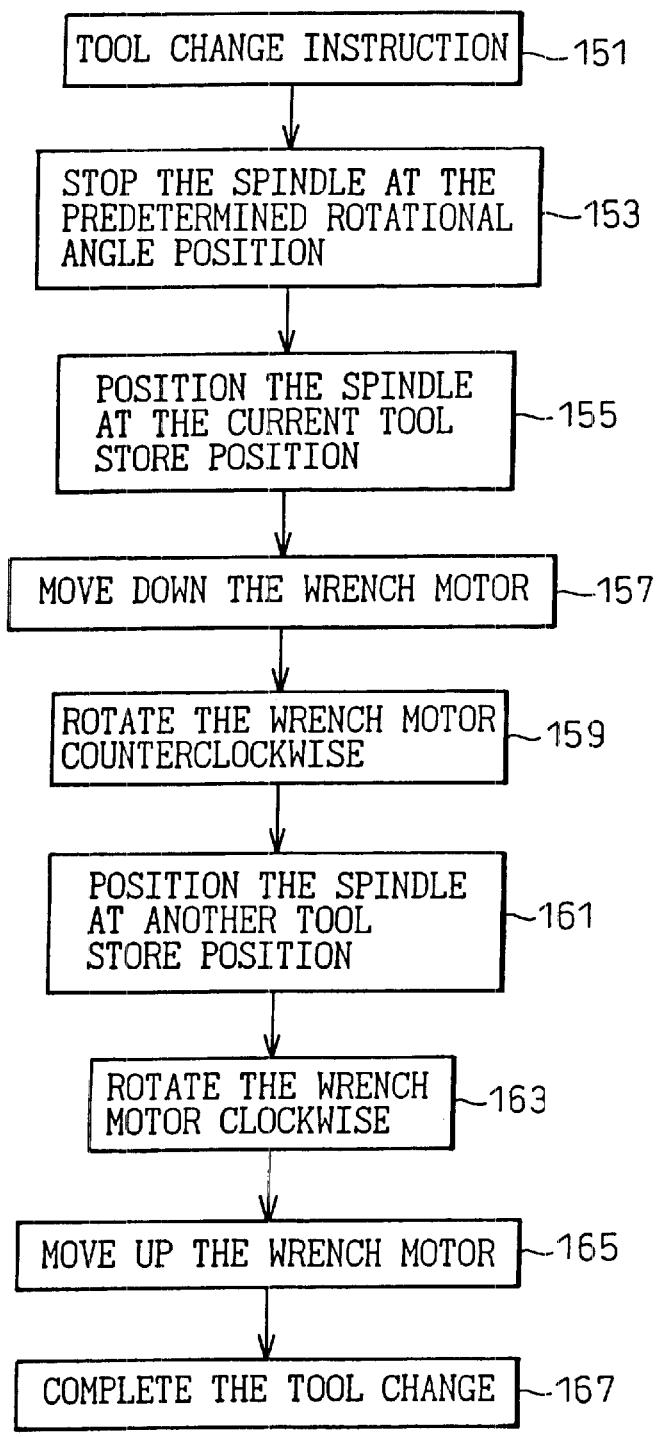
FIG. 3 is a flow chart showing a tool change operation in the machine tool using the spindle unit according to the present invention shown in FIG. 1.

Referring to FIG. 3, the tool change operation of the spindle unit 11 for the machine tool shown in FIG. 1 will now be described.

When an NC (numerical control) device of the machine tool provides a tool change instruction to the spindle unit 11 at step 151, the spindle unit 11 stops the spindle 13 in a predetermined rotational angle position so as to allow the locking element 61 of the pressure element driving device to engage with the notches or grooves 63 formed on the rear end face of the spindle 13 at step 153. It should be noted that in the above rotational angle position, the wrench 49 can engage with the engaging recess of the pressure element. Such rotational positioning of the spindle 13 can be achieved, for example, by a well-known technique such as use of a sensor (not shown). Next, at step 155, the spindle 13 with the tool mounted therein is moved in directions of the X-axis, Y-axis and Z-axis and then positioned in an empty space of a tool magazine (not shown).

Next, at step 157, the wrench motor 51 of the pressure element driving device is moved down (toward the rear end face of the spindle 13) to engage the locking element 61 of the pressure element driving device with the notches or grooves 63 formed on the rear end face of the spindle 13. This engagement locks the spindle 13 to prevent its rotation. At the same time, the wrench 49 attached to the wrench motor 51 engages with the engaging recess formed on the rear end of the pressure screw 45.

At step 159, the wrench motor 51 is rotated counterclockwise and moves the pressure element rearwards toward the pressure element driving device within the pressure element insert hole 41 to move the piston 43 of the pressure element rearwards within the working fluid passage 33. This movement of the piston 43 decreases the pressure of the working fluid enclosed in the working fluid passage 33 and the pressure chamber 31 communicating therewith, so that the thin wall 29 between the pressure chamber 31 and the tool receiving bore 25, which expands inwardly into the tool receiving bore, deforms elastically to move outwardly in the radial direction of the tool receiving bore 25. As a result, the tool receiving bore 25 is enlarged in radius to release the tool held therein, and the released tool is stored in the tool magazine.

Next, at step 161, the spindle without a tool held therein is moved in directions along the X-axis, Y-axis and Z-axis and positioned at a desired tool store position for insertion of another tool in the tool receiving bore 25.

At step 163, the wrench motor 51 is rotated clockwise and moves the pressure element forwards toward the forward end of the spindle 13 within the pressure element insert hole 41 to move the piston 43 forwards within the working fluid passage 33. This movement increases the pressure of the working fluid enclosed in the working fluid passage 33 and the pressure chamber 31 communicating therewith, so that the thin wall 29 between the pressure chamber 31 and the tool receiving bore 25 deforms elastically to move inwardly in the radial direction of the tool receiving bore 25. As a result, the tool receiving bore 25 is reduced in radius to hold the tool inserted therein.

At step 165, when the tool is held in the tool receiving bore 25, the wrench motor 51 of the pressure element driving device is moved up (away from the rear end face of the spindle 13) to disengage the wrench 49 attached to the wrench motor 51 from the engaging recess formed on the rear end of the pressure screw 45. At the same time, the locking element 61 of the pressure element driving device, which is in engagement with the notches or grooves 63 formed on the rear end face of the spindle 13, disengages from the notches or grooves 63.

The tool change operation is performed by the above steps, and after completion of the tool change operation, machining restarts with the new tool at step 167.

The wrench motor 51 shown in FIG. 1 for use in the embodiment of the spindle unit 11 for the machine tool according to the present invention requires three types of control: (1) rotational speed control for controlling the rotational speed of the wrench motor 51 to prevent damage of the pressure element due to excessively high speed rotation of the pressure screw 45; (2) position control of the rotational angle for rotationally positioning the pressure screw 45 of the pressure element in a predetermined range of rotational angle; and (3) torque control for maintaining the working fluid passage 33 and the pressure chamber 31 at a predetermined pressure. However, a servomotor, which is generally used as the wrench motor 51, cannot perform these three types of control at once. Consequently, in order to implement the required control, the servomotor in the above embodiment utilizes its built-in function, i.e. a "torque limit function", which generates a signal when the torque in the servomotor reaches a preset level, thereby switching to either of two operating modes, a first operating mode for performing the rotational speed control and the position control at once and a second operating mode for performing only the torque control.

Figure 4:
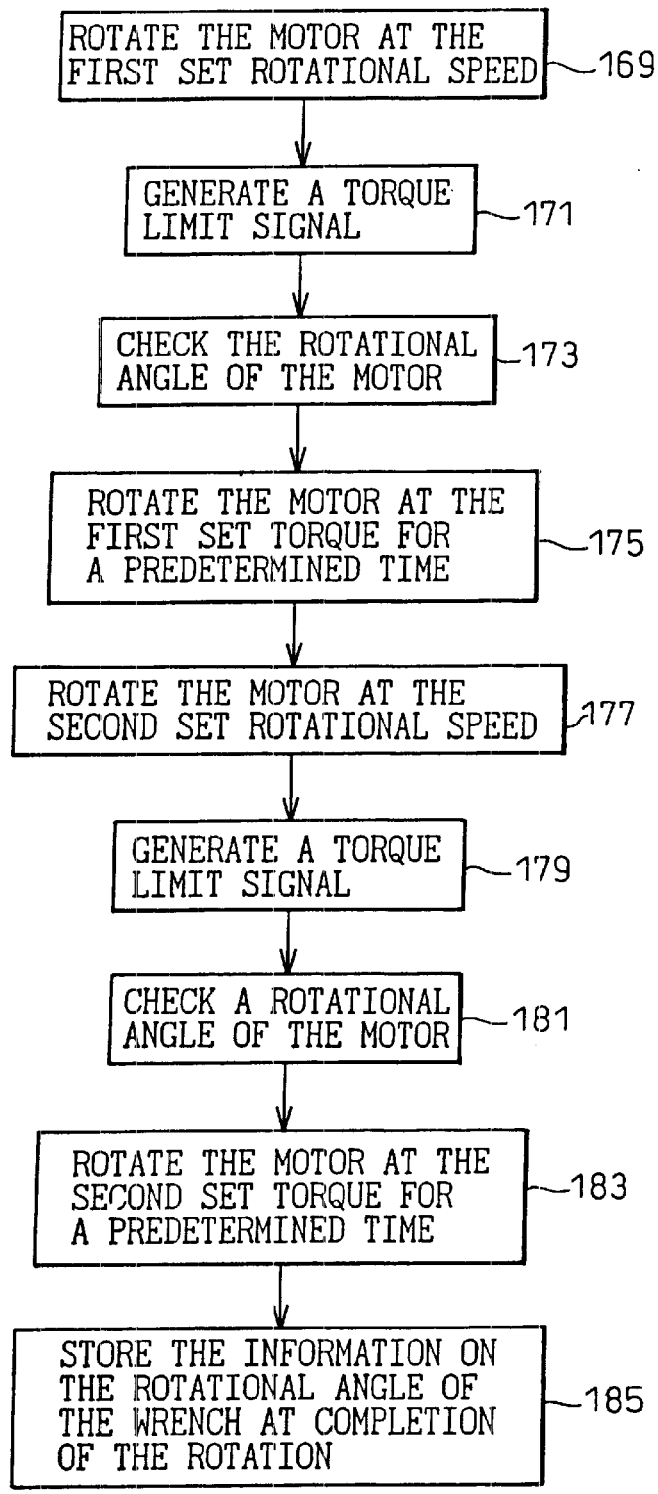
FIG. 4 is a flow chart showing the tool hold operation shown in FIG. 3 in more detail.
Figure 5:
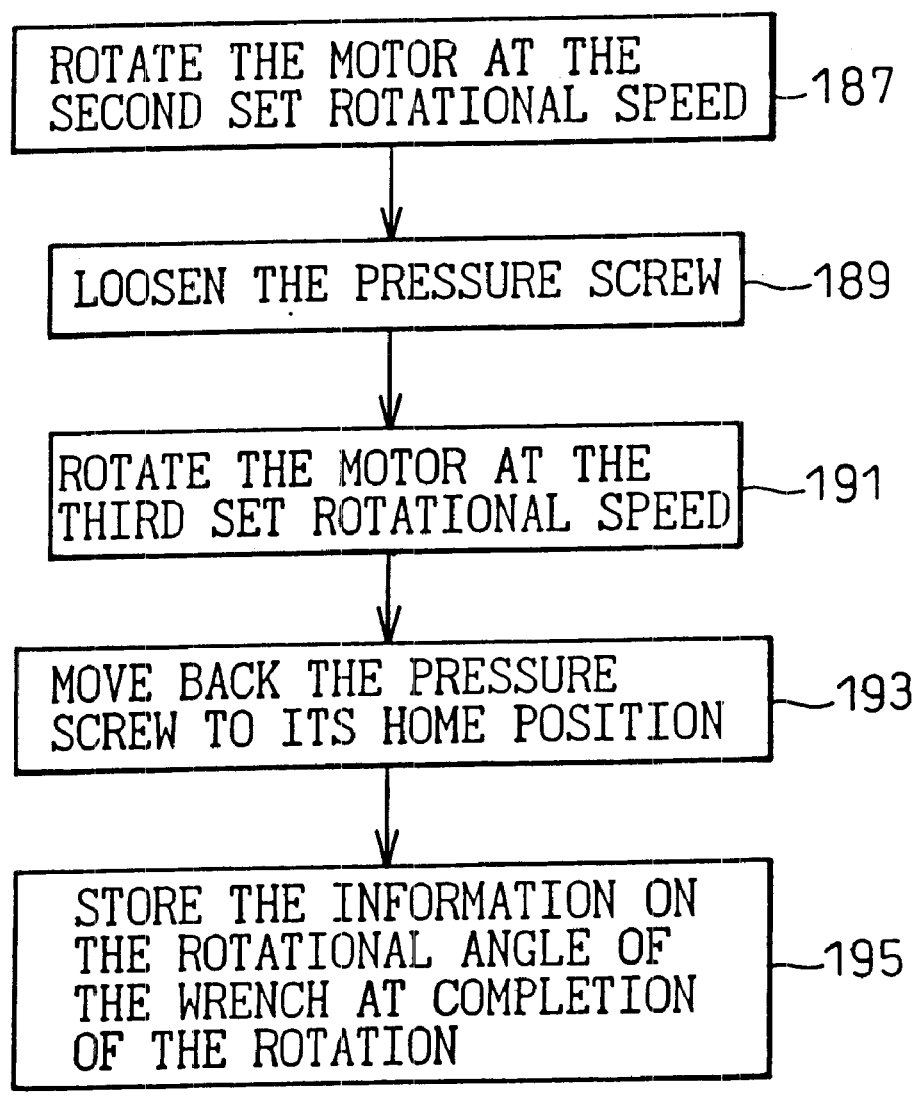
FIG. 5 is a flow chart showing the tool release operation shown in FIG. 3 in more detail.

Referring to FIGS. 4 and 5, the steps of the clockwise rotation and the counterclockwise rotation of the wrench motor 51 controlled above will be now described in more detail.

Firstly, referring to FIG. 4, the step of clockwise rotation of the wrench motor 51, i.e. the tool hold process for holding the tool in the spindle 13, will be described. The tool hold process is achieved by two separate processes, a standard tightening process and a secondary tightening process. Assume that a first set torque and a first set rotational speed at the standard tightening process, as well as a second set torque and a second set rotational speed at the secondary tightening process, are predetermined.

Firstly, when the standard tightening process of the tool hold process starts, the wrench motor 51 is switched to the first operating mode by the controller 55 to enable the rotational speed control and the position control, and a predetermined torque level (the first set torque) is preset as a torque limit for the standard tightening of the tool hold process. At step 169, the wrench motor 51 is then rotated clockwise (i.e. in a direction to tighten a screw) at the first set rotational speed (for example, at a rotational speed where the pressure screw 45 may be moved at 1000 mm/min). At step 171, when the torque level of the wrench motor 51 reaches the first set torque, the wrench motor 51 (servomotor) generates a torque limit signal by its torque limit function to stop its rotation. At step 173, the controller 55 then checks that the rotational angle of the wrench motor 51 or the position of the pressure screw 45 falls within a predetermined range.

For example, if the rotational angle of the wrench motor 51 is less than the minimum limit of the predetermined range, galling of the pressure screw 45 may be suspected, or otherwise if the rotation angle of the wrench motor exceeds the maximum limit of the predetermined range, this may be due to insufficient engagement causing slipping between the wrench 49 and the engaging recess of the pressure screw 45. Therefore, the wrench motor 51 or the controller 55 preferably generates a warning signal to indicate an abnormal state when the rotational angle of the wrench motor 51 does not fall within the predetermined range.

When the result of checking indicates that the rotational angle of the wrench motor 51 is within the predetermined range, the wrench motor 51 (servomotor) is switched from the first operating mode to the second operating mode to enable torque control. Next, at step 175, the wrench motor 51 restarts clockwise rotation, and stops rotation after a predetermined time (for example, two seconds), at which the torque level of the wrench motor 51 exceeds the first set torque. In other words, the wrench motor 51 rotates clockwise for the predetermined time under the first set torque.

After completion of the standard tightening process, the secondary tightening process is then performed. The secondary tightening process is generally similar to the standard tightening process. Firstly, when the secondary tightening process starts, the wrench motor 51 is switched again from the second operating mode to the first operating mode by the controller 55 to enable rotational speed control and the position control, and a predetermined torque level (the second set torque) is preset as a torque limit for the secondary tightening. At step 177, the wrench motor 51 is then rotated clockwise at the second set rotation speed (for example, at a rotation speed where the pressure screw 45 may be moved at 100 mm/min). At step 179, when the torque level of the wrench motor 51 reaches the second set torque, the wrench motor 51 (servomotor) generates a torque limit signal by its torque limit function to stop its rotation. At step 181, the controller 55 then checks that the rotational angle of the wrench motor 51 or the position of the pressure screw 45 falls within a predetermined range. When the result of the check indicates that the rotational angle of the wrench motor 51 falls within the predetermined range, the wrench motor 51 (servomotor) is switched from the first operating mode to the second operating mode to enable torque control. Next, at step 183, the wrench motor 51 restarts clockwise rotation. The wrench motor 51 stops rotation after a predetermined time (for example, two seconds) at which the torque level of the wrench motor 51 exceeds the second set torque. At this point, the secondary tightening process is completed.

After completion of the secondary tightening process, the controller 55 at step 185 stores the information on the rotational angle of the wrench motor 51 prior to movement of the motor 51 away from the spindle 13, in order to ensure engagement of the wrench with the engaging recess of the pressure screw 45 of the pressure element during the tool release process.

Next, referring to FIG. 5, the counterclockwise rotational step of the wrench motor 51, i.e. the tool release process for releasing the tool from the spindle 13, will be described. Assume that in addition to the first set torque, the first set rotational speed, the second set torque and the second set rotational speed which are predetermined in the tool hold process, and a third set rotational speed for use in the following steps are predetermined.

Firstly, when the tool release process starts, the wrench motor 51 is switched to the first operating mode by the controller 55 to enable rotational speed control and position control, and a torque level (the third set torque) higher than the second set torque preset during the tool hold process is preset as a torque limit for the tool release process. At step 187, the wrench motor 51 is then rotated counterclockwise (i.e. in a direction to loosen a screw) at the second set rotational speed. At step 189, after the wrench motor 51 is rotated by a predetermined rotational angle to move the pressure screw 45 of the pressure element by a predetermined distance toward the rear end face of the spindle 13, the controller 55 stops rotation of the wrench motor 51. At step 191, the wrench motor 51 is rotated counterclockwise by a predetermined rotational angle at the third set rotational speed (for example, at a rotational speed where the pressure screw 45 may be moved at 3000 mm/min). At step 193, when the pressure screw 45 of the pressure element is moved back to its home position, the controller 55 stops rotation of the wrench motor 51. The wrench 49 usually does not disengage from the engaging recess of the pressure screw 45 before completion of the subsequent tool hold process, although the wrench 49 can be disengaged from the engaging recess of the pressure screw 45 for reasons of maintenance, etc. Consequently, at step 195, the controller 55 stores the information on the rotational angle of the stopped wrench motor 51. Thus, the tool release process is completed.

In the embodiment shown in FIGS. 1 and 2A, the tool receiving bore is defined by the cylindrical sleeve 27, with the recess formed on the outer peripheral surface thereof being inserted into the bore on the forward end face of the spindle 13. However, as shown in FIG. 2B, a separate adapter 67, having one or more pressure chambers 31 which are disposed around the tool receiving bore 25 in spaced relationship from it by a thin wall 29 deformable in the radial direction of the sleeve 27, may be prepared and fixedly secured on the forward end of the spindle 13 so as to form one unit therewith. In this case, the inner peripheral surface of the tool receiving bore 25 is also preferably machined by grinding to bring the center axis of the tool receiving bore 25 into line with the rotational axis of the spindle. The spindle 13 may be also integrally provided with a tool receiving bore 25 and one or more pressure chambers 31 disposed around the tool receiving bore 25 in spaced relationship therefrom by a thin wall 25 elastically deformable in the radial direction of the spindle 13.

Figure 6:
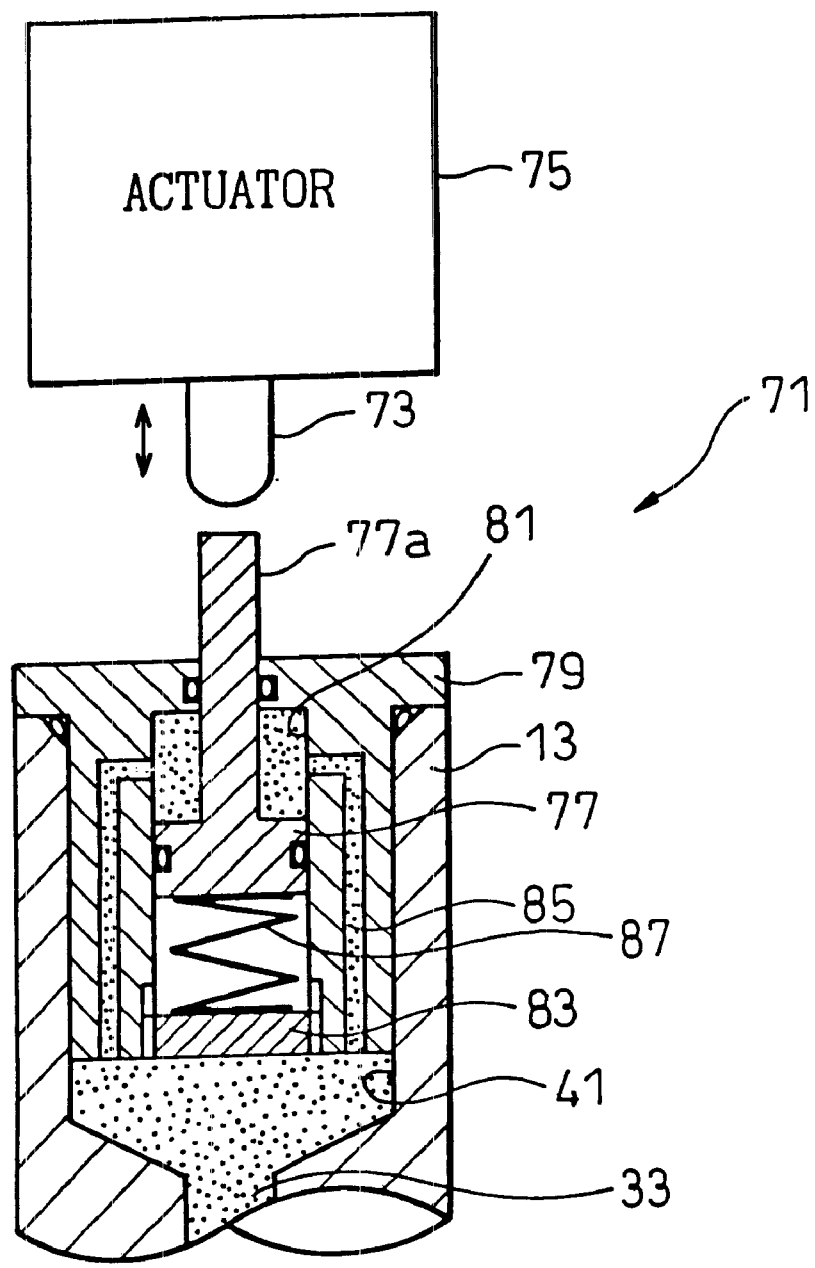
FIG. 6 is a longitudinal, sectional view of a main part of a second embodiment of a pressure adjusting device applicable to the spindle unit of the machine tool according to the present invention.
Figure 7:
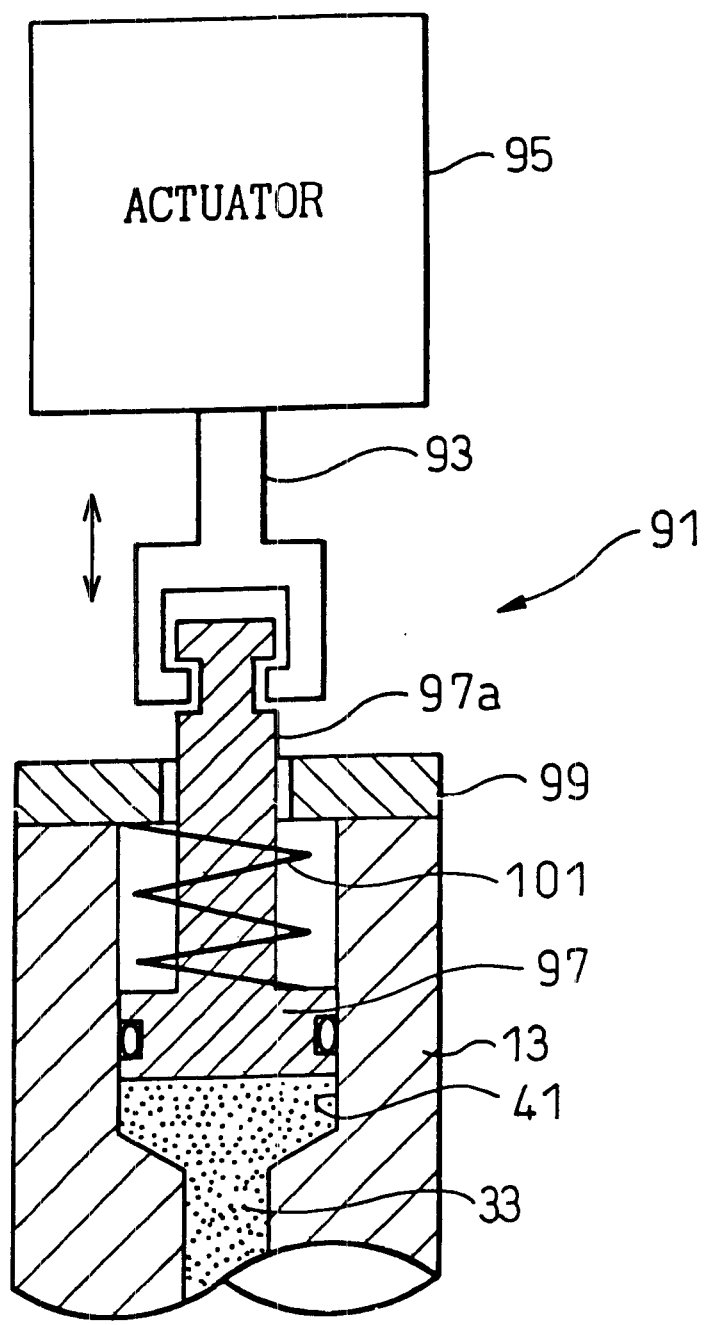
FIG. 7 is a longitudinal sectional view of a main part of a third embodiment of a pressure adjusting device applicable to the spindle unit of the machine tool according to the present invention.
Figure 8:
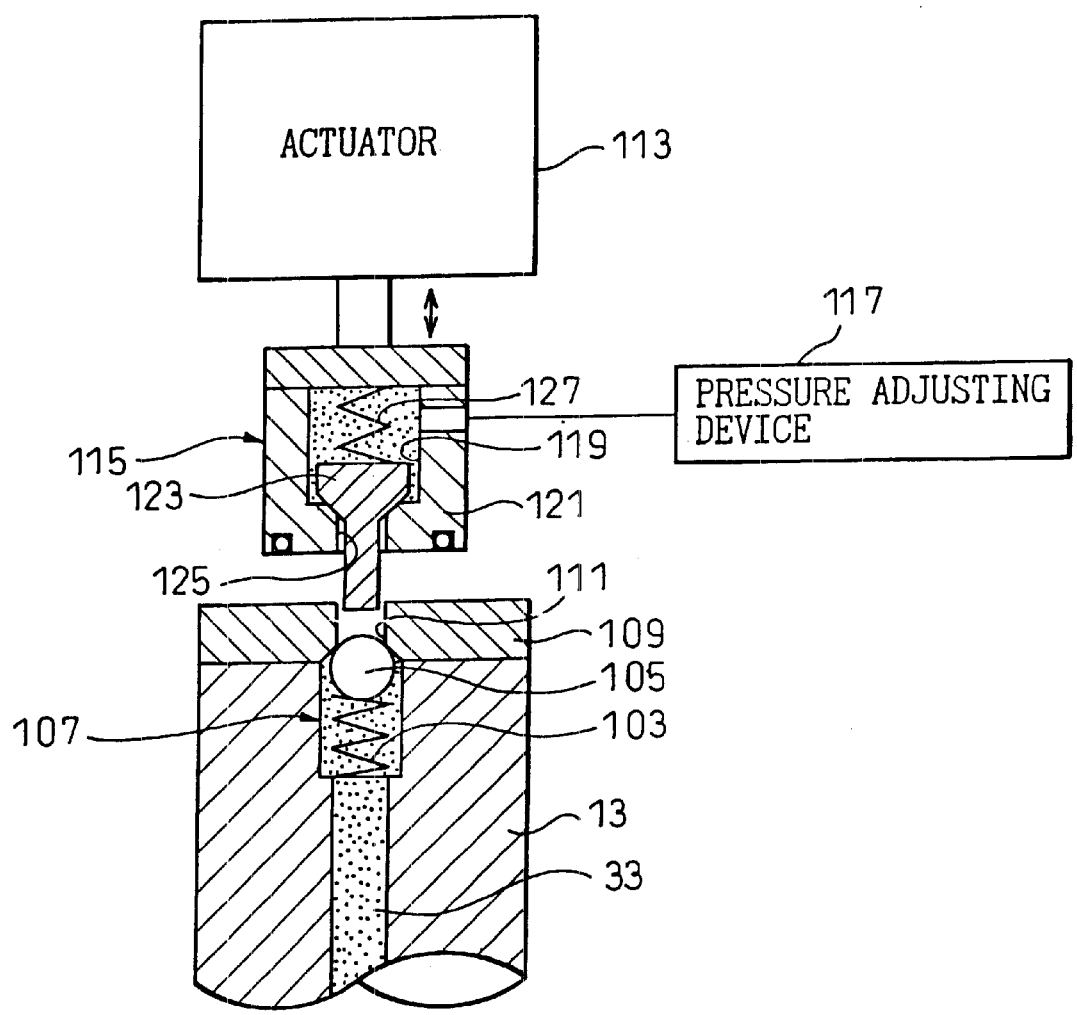
FIG. 8 is a longitudinal sectional view of a main part of fourth embodiment of a pressure adjusting device applicable to the spindle unit of the machine tool according to the present invention.

Other embodiments of the pressure adjusting device, different from that shown in FIG. 1, are shown in FIGS. 6 to 8.

A pressure adjusting device 71 shown in FIG. 6 includes a pressure element which is inserted in the pressure element insert hole 41 formed in the rear end face of the spindle 13 and communicating with the working fluid passage 33, and a pressure element driving device in the form of an actuator 75 having a rod 73 which can extend and retract in the axial direction of the spindle 13.

The pressure element includes a piston 77 and an end cap 79 inserted into the pressure element insert hole 41 for closing it. A bore 81 is formed on the side of the end cap 79 facing the inside of the spindle 13 and a closing plug is screwed in the opening end of the bore 81. The piston 77 is arranged within a space defined by the bore 81 of the end cap 79 and the closing plug 83 and divides the space into two portions. The portion of the divided space positioned on the side of the actuator 75 is in communication with the working fluid passage 33 through a connecting passage 85 and is filled with a working fluid.

A compression spring 87 for urging the piston 77 in a direction to increase the pressure of the working fluid is placed within the other portion of the divided space by the piston 77, so that the piston 77 can always apply an urging force to the working fluid within the pressure chamber 31 and the working fluid passage 33 through the space and the connecting passage 85 to hold the tool in the tool receiving bore 25. On the other hand, a rod 77a extends from the piston 77 through the bottom of the bore 81 of the end cap 79 to the outside of the spindle 13. This arrangement makes it possible for the actuator 75 to release the tool from the tool receiving bore 25 by the rod 73, separate from the rod 77a of the piston 77 pushing the rod 77a toward the forward end of the spindle 13 against the urging force of the compression spring 87 to decrease the pressure of the working fluid within the pressure chamber 31 through the working fluid passage 33.

A pressure adjusting device 91 shown in FIG. 7, similar to that shown in FIG. 6, includes a pressure element which is inserted in the pressure element insert hole 41 formed in the rear end face of the spindle 13 and communicating with the working fluid passage 33, and a pressure element driving device in the form of an actuator 95 having a rod 93 which can extend and retract in the axial direction of the spindle 13. The pressure element includes a piston 97, which has a rod 97a extending out of the spindle 13 toward the actuator 95 through an end cap 99 attached to the rear end face of the spindle 13 for closing the pressure element insert hole 41.

In the pressure element insert hole 41 between the piston 97 and the end cap 99 is defined a space, within which a compression spring 101 for urging the piston 97 forwardly is placed so that the piston 97 can always apply an urging force to the working fluid within the pressure chamber 31 via the working fluid passage 33, thereby increasing the pressure of the working fluid within the pressure chamber 31 to hold the tool in the tool receiving bore 25. On the other hand, an end of a rod 97a extending from the piston 97 is rotatably coupled to an end of the rod 93 of the actuator 95. This arrangement makes it possible for the actuator 95 to release the tool from the tool receiving bore 25 by the rod 93 rotatably coupled to the rod 97a of the piston 97 drawing the rod 97a and the piston 97 toward the actuator 95 against the urging force of the compression spring 101 to decrease the pressure of the working fluid within the pressure chamber 31 through the working fluid passage 33. It should be noted that the compression spring can generate a pressure in the working fluid within the pressure chamber 31 sufficient to hold the tool in the tool receiving bore 25, as in the case of that of the pressure adjusting device 71 shown in FIG. 6.

Referring to FIG. 8, a check valve 107 including a spring 103 and a steel ball 105 is disposed at the rear end of the working fluid passage 33 opening to the rear end face of spindle 13. In other words, the working fluid passage 33 opens to the rear end face of the spindle through the check valve 107. More specifically, an end cap 109 is attached to the rear end of the spindle 13 to provide a rear end face of the spindle 13 and is formed with a port 111 connected to the working fluid passage 33 of the spindle 13 and usually closed by the steel ball 105 urged rearward by the spring 103. A pressure adjusting device 117 is disposed behind the rear end face of the spindle 13 and includes a working fluid feeding device 115 which can be driven forward and rearward by the actuator 113 to be seated on the rear end face of the spindle 13. When the working fluid feeding device 115 is seated on the rear end face of the spindle 13, it can open the check valve 107 and provide fluid communication between the working fluid passage 33 and the pressure adjusting device 117, so that the pressure adjusting device 117 can control the pressure of the working fluid within the pressure chamber 31 through the working fluid passage 33.

The working fluid feeding device 115 shown in FIG. 8 includes a housing 121 with a cavity 119 formed therein and a valve opening member 123 accommodated in the housing 121.

The cavity 119 of the housing 121 is in fluid communication with the pressure adjusting device 117 and filled with the working fluid. A wall of the housing 121 facing the rear end face of the spindle 13 is also formed with a through hole 125, through which the working fluid within the cavity 119 can flow to the outside of the housing 121.

The valve opening member 123 is constantly urged by a compression spring 127 placed in the cavity 119 to close the through hole 125. The valve opening member 123 also includes a projecting portion 123a extending through the through hole 125 of the housing 121 toward the rear end face of the spindle 13. When the working fluid feeding device 115 is seated on the rear end face of the spindle 13, the projecting portion 123a of the valve opening member 123 is inserted into the port 111 and pushes back the steel ball 105 of the check valve 107 to open the check valve 107. At the same time, the urging force applied by the spring 103 of the check valve 107 to the valve opening member 123 moves the valve opening member 123 in a direction to open the through hole 125. This provides fluid communication between the working fluid passage 33 and the pressure adjusting device 117 through the cavity 119 in the housing 121 of the working fluid feeding device 115.

Thus, when the working fluid feeding device 115 is seated on the rear end face of the spindle 13, the pressure adjusting device 117 comes into fluid communication with the working fluid passage 33, so that the pressure adjusting device 117 can control the pressure of the working fluid within the pressure chamber 31 through the working passage 33 to perform holding or releasing of the tool inserted in the tool receiving bore 25.

As described above, the spindle unit according to the present invention can eliminate or reduce deviation of the axial position at which the spindle holds the tool, and prevent eccentric rotation of the tool due to misalignment of the rotational axis of the spindle with the center axis of the tool, thereby to enable highly accurate machining by the machine tool, and thus overcome drawbacks associated with a conventional tool holding system using a collet. Further, the spindle unit does not require a pressure changing operation for holding the tool in or releasing it from the spindle at the forward end portion of the spindle, in which the spindle, the housing for supporting the spindle and other parts tend to interfere with the operation and there is in sufficient space for the operation to be performed comfortably. This facilitates the operation of holding the tool in or releasing it from the spindle, thereby making it easy to automate the operation.

While the present invention has been described with reference to specific embodiments chosen for the purposes of illustration, it should be apparent that numerous modifications and changes can be made thereto by those skilled in the art without departing from the basic concept and scope of the present invention.

What is claimed is:

1. A spindle unit for a numerical controlled machine tool having a spindle housing comprising:

a spindle having a rotational axis and rotatably supported in said spindle housing;

a tool receiving bore formed directly in the forward end portion of said spindle, the center axis of said tool receiving bore extending along the line of the rotational axis of said spindle;

one or more pressure chambers disposed within the forward end portion of said spindle and around said tool receiving bore in spaced relationship from said tool receiving bore by a thin wall, said thin wall forming a sleeve within said tool receiving bore being elastically deformable in a radial direction of said spindle, each said pressure chamber being filled with working fluid to expand said thin wall;

a working fluid passage formed entirely within said spindle and in fluid communication with said one or more pressure chambers; and a pressure adjusting device arranged in the rear portion of said spindle unit and connected to said pressure chamber through said working fluid passage, said pressure adjusting device adjustably changing the pressure of the working fluid within said pressure chamber so that said pressure adjusting device can elastically deform said thin wall to enlarge or reduce said tool receiving bore in radius, thereby holding or releasing the tool inserted into said tool receiving bore.

2. The spindle unit according to claim 1, wherein a check valve is disposed at the rear end of said working fluid passage opening at the rear end of said spindle, and said pressure adjusting device comprises a movable working fluid feeding device able to be seated on said rear end face of said spindle, said working fluid feeding device opening said check valve to provide fluid communication between said working fluid passage and said pressure adjusting device when said working fluid feeding device is seated on said rear end face, thereby allowing the working fluid feeding device to control the pressure of said working fluid within said pressure chamber.

3. A spindle unit for a machine tool having a spindle housing comprising;

a spindle having a rotational axis and rotatably supported in said spindle housing;

a tool receiving bore formed in the forward end portion of said spindle and extending along the rotational axis of said spindle;

one or more pressure chambers disposed around said tool receiving bore in spaced relationship from said tool receiving bore by a thin wall elastically deformable in a radial direction of said spindle, said pressure chamber being filled with working fluid;

a working fluid passage formed in said spindle and in fluid communication with said one or more pressure chambers; and a pressure adjusting device arranged in the rear portion of said spindle unit and connected to said pressure chamber through said working fluid passage; said pressure adjusting device adjustably changing the pressure of the working fluid within said pressure chamber so that said pressure adjusting device can elastically deform said thin wall to enlarge or reduce said tool receiving bore in radius, thereby holding or releasing the tool inserted into said tool receiving bore;

wherein a pressure element insert hole is formed in the rear end portion of said spindle to be in fluid communication with said working fluid passage, and wherein said pressure adjusting device comprises a pressure element inserted into said pressure element insert hole for pressurizing the working fluid in said working fluid passage and a pressure element driving device for driving said pressure element.

4. The spindle unit according to claim 3, wherein said pressure element comprises a piston and wherein a space defined by said pressure element insert hole and said piston is filled with the working fluid and in fluid communication with said working fluid passage.

5. The spindle unit according to claim 4, wherein said pressure element further comprises a pressure screw coupled to said piston and wherein said pressure element insert hole is formed with a threaded portion for engaging with said pressure screw of said pressure element.

6. The spindle unit according to claim 5, wherein said pressure element driving device comprises a motor having a rotatable wrench for rotating said pressure screw, an actuator for moving said wrench to engage said wrench with and disengage it from said pressure screw, and a controller for controlling the operations of said actuator and said motor.

7. The spindle unit according to claim 6, wherein said motor comprises a servomotor.

8. The spindle unit according to claim 7, wherein during a process for holding the tool in said spindle, said controller operates said servomotor in a first operating mode in which rotational speed control and position control are performed, and subsequently operates said servomotor in a second operating mode in which torque control is performed.

9. The spindle unit according to claim 4, wherein said pressure element driving device, is rotatably coupled to said piston.

10. The spindle unit according to claim 9, wherein a compression spring is placed within said space so as to urge said piston in a direction to increase the pressure of the working fluid in said space.

11. The spindle unit according to claim 4, wherein a compression spring is placed within said space so as to urge said piston in a direction to increase the pressure of the working fluid pressure in said space and wherein said pressure element driving device is separate from said piston and moves said piston against an urging force of said compression spring to release the tool in said tool receiving bore.

12. The spindle unit according to claim 3, wherein a check valve is disposed at the rear end of said working fluid passage opening at the rear end of said spindle, and said pressure adjusting device comprises a movable working fluid feeding device able to be seated on said rear end face of said spindle, said working fluid feeding device opening said check valve to provide fluid communication between said working fluid passage and said pressure adjusting device when said working fluid feeding device is seated on said rear end face, thereby allowing the working fluid feeding device to control the pressure of said working fluid within said pressure chamber.

13. A spindle unit for a numerically controlled machine tool having a spindle housing comprising:

a spindle having a rotational axis and rotatably supported in said spindle housing;

a tool receiving bore formed directly in the forward end portion of said spindle, the center axis of said tool receiving bore extending in line with the rotational axis of said spindle;

one or more pressure chambers disposed within said spindle and around said tool receiving bore in spaced relationship from said tool receiving bore by a thin wall elastically deformable in a radial direction of said spindle, said pressure chamber being filled with working fluid;

a working fluid passage formed in said spindle and extending longitudinally there along to be in fluid communication with each of said one or more pressure chambers; and a pressure adjusting device arranged behind the rear portion of said spindle unit to be able to be connected to and disconnected from said working fluid passage, said pressure adjusting device adjustably changing the pressure of the working fluid within said pressure chamber when said pressure device is connected to said working fluid passage, so that said pressure adjusting device can elastically deform said thin wall to enlarge or reduce said tool receiving bore in radius, thereby holding or releasing the tool inserted into said tool receiving bore.

14. A spindle unit for a machine tool having a spindle housing comprising:

a spindle having a rotational axis and rotatably supported in said spindle housing;

a tool receiving bore formed directly in the forward end portion of said spindle, the center axis of said tool receiving bore extending in line with the rotational axis of said spindle;

one or more pressure chambers disposed around said tool receiving bore in spaced relationship from said tool receiving bore by a thin wall elastically deformable in a radial direction of said spindle, said pressure chamber being filled with working fluid;

a working fluid passage formed in said spindle and in fluid communication with said one or more pressure chambers; and a pressure adjusting device arranged behind the rear portion of said spindle unit to be able to be connected to and disconnected from said working fluid passage, said pressure adjusting device adjustably changing the pressure of the working fluid within said pressure chamber when said pressure device is connected to said working fluid passage, so that said pressure adjusting device can elastically deform said thin wall to enlarge or reduce said tool receiving bore in radius, thereby holding or releasing the tool inserted into said tool receiving bore;

wherein a check valve is disposed at the rear end of said working fluid passage opening at the rear end of said spindle, and said pressure adjusting device comprises a movable working fluid feeding device able to be seated on said rear end face of said spindle, said working fluid feeding device opening said check valve to provide fluid communication between said working fluid passage and said pressure adjusting device when said working fluid feeding device is seated on said rear end face, thereby allowing the working fluid feeding device to control the pressure of said working fluid within said pressure chamber.

* * * * *